United States Patent [19]

Hitchins, III et al.

[11] 3,771,819

[45] Nov. 13, 1973

[54] AXIALLY AND ROTATABLY MOVABLE FLANGE CONNECTOR

[75] Inventors: Joseph J. Hitchins, III, Annapolis; Carl H. Hohenberger, Baltimore; Allen E. Holmes, Timonium, all of Md.

[73] Assignee: Hydrasearch Co., Inc., Annapolis, Md.

[22] Filed: Dec. 1, 1971

[21] Appl. No.: 203,751

[52] U.S. Cl. .............................................. 285/312
[51] Int. Cl. ........................................... F16l 37/18
[58] Field of Search .................... 285/310, 311, 312, 285/308, 309

[56] References Cited
UNITED STATES PATENTS
3,445,127  5/1969  Clarke ........................... 285/310 X
3,361,452  1/1968  Holister ............................. 285/312

*Primary Examiner*—Jordan Franklin
*Assistant Examiner*—Wayne L. Shedd
*Attorney*—William J. Dick

[57] ABSTRACT

A modular flange connector for connecting the terminal flanges of conduits, the connector comprising clamps for attachment to one flange of one conduit and for quick connection to the flange of the other conduit. Each clamp comprises a tubular base in which is slideably disposed a clamping hook having a central cylindrical shaft portion, a threaded rear shaft portion and a hook shaped forward portion. The threaded rear shaft portion is engaged by a sleeve shaped adjusting nut which cooperates with the base to effect axial movement of the clamping hook in the tubular base. A cam is mounted on the base and is provided with a handle to effect rotation of the cam, the cam being adapted for engagement with the adjusting nut so that upon rotation of the cam additional axial movement of the clamping hook is effected. The clamping hook is capable of axial movement and rotational movement, there being a catch provided so that the hook may be rotated clear of the mating flange to facilitate coupling and uncoupling of the flanges.

6 Claims, 4 Drawing Figures

PATENTED NOV 13 1973 3,771,819

INVENTORS
JOSEPH J. HITCHINGS III
CARL H. HOHENBURGER
ALLEN E. HOLMES

BY *William J. Dick*
ATTORNEY

AXIALLY AND ROTATABLY MOVABLE FLANGE CONNECTOR

SUMMARY OF THE INVENTION AND STATE OF THE PRIOR ART

The present invention relates to couplings and more particularly to quick-connect couplings for conduits including hoses, pipes and the like to facilitate the making of connections between contiguous liquid or gaseous medium carrying conduits.

More particularly the present invention relates to a universal coupling for connecting the flange on a first conduit to the flange on a second conduit. As will be more fully described hereinafter, the coupling may be made up on the job by connecting to the existing flange on a conduit the clamp of the present invention, in any numbers or quantity that is desirable depending upon the size and operating pressure of the coupling. The individual clamps comprise a tubular base in which is axially slideably mounted a clamping hook, one portion of the hook being threaded so as to engage a sleevelike adjusting nut, the adjusting nut cooperating with the base to effect axial movement of the clamping hook. A cam is mounted on the base and cooperates with the adjusting nut so that upon tightening the nut, the hook engages the flange of the conduit to be connected. Thereafter, a quick turn of the cam creates an additional clamping and locking action. To facilitate clearance of the hooks from flanges of adjacent conduits, when either hooking or unhooking, the hook is rotatable but capable of being held in either the adjacent flange connection or clearance position.

There are many adapters available for utilization in marine facilities where ships of various nationalities deliver oil for storage and the like. Very few of the ships have a standard flange on the terminal end or ends of the ship-to-shore hoses so that it may be easily and quickly coupled to the onshore rig. Additionally, the end conduits or hoses are heavy and difficult to work with and offtimes connections must be made on the spot and many times in tight and cramped quarters. One such successful universal flange coupling is disclosed in U.S. Pat. No. 3,445,127, this coupling being adapted to engage the flange of the contiguous conduit and effect engagement of the conduit by a pivotal action of the hook and then tightening thereof. It has been discovered that while this type of action is effective for a good engagement of contiguous flanges, in tight quarters the fact that the hooks must be pivoted is offtimes impractical due to space requirements. Additionally, while this type of coupling is very effective, it is expensive as well as adding additional weight to the coupling and thus the hose or conduit terminal ends.

In view of the above it is a principal object of the present invention to provide a novel modular flange connector for facilitating the coupling of contiguous conduits for the transfer of both liquid and gaseous media.

Another object of the present invention is to provide a modular flange connector which permits the coupling of contiguous conduits with some mismatch in flange size, which coupling may be effected in a quick and easy manner.

Still another object of the present invention is to provide a modular flange connector comprised of individual clamps which may be easily mounted in any number at any desired spacing around the flange in a quick and easy manner.

Yet another object of the present invention is to provide a modular flange connector which has a straight line as opposed to a pivot type action to clear the flange of the contiguous conduit to facilitate engagement and disengagement of the flanges.

Yet another object of the present invention is to provide a modular flange connector with a rotating hook and means to retain the hook in its disconnect or connect position to facilitate the clearance of the flange of the adjacent conduit during connection and disconnection of the flange of the contiguous conduit.

Still a further object of the present invention is to provide a modular flange connector which is inexpensive in cost while retaining all of the strength necessary to permit of high hydraulic loads interiorally of the conduits.

Other objects and a more complete understanding of the invention may be had by referring to the following specification and claims taken in conjunction with the accompanying drawings in which:

Figure 1:
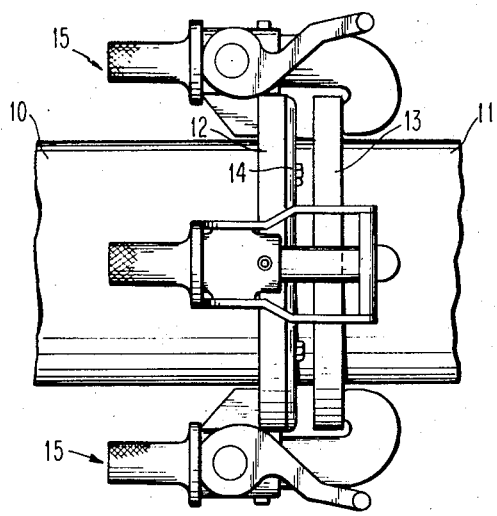
FIG. 1 is a fragmentary side elevational view illustrating the novel clamps of the modular flange connector in position coupling contiguous conduits and prior to locking of the clamps.
Figure 2:
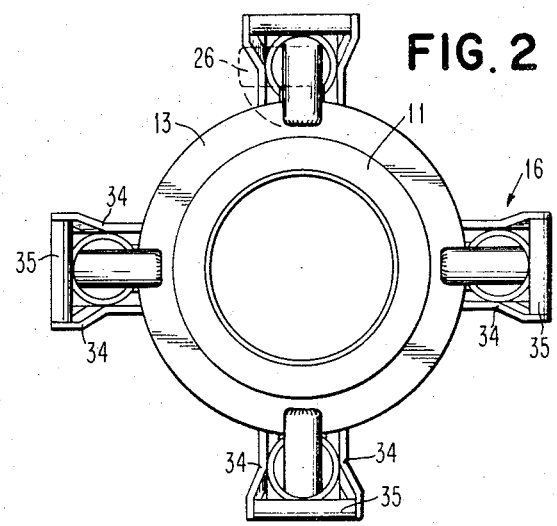
FIG. 2 is a front elevational view of the novel clamps of the present invention illustrated in FIG. 1.

Referring now to the drawing and specifically FIG. 1 thereof, adjacent or contiguous conduits 10 and 11 are shown connected together through their respective flanges 12 and 13 by a modular flange connector 15 constructed in accordance with the present invention. As will be more fully explained hereinafter, the modular flange connector is comprised of one or more clamps 16 which is connected to one of the flanges of the contiguous conduits, for example the flange 12, and is adapted to engage and secure the adjacent flange 13 either directly to the flange 12 or to it through an adapter plate 14 sandwiched between the adjacent flanges 12 and 13. The novel clamps may be positioned individually and selectively at spaced positions circumferentially of the flange, for example, and as illustrated in FIG. 2, at 90° spaced apart intervals circumscribing the periphery of the flange.

In accordance with the invention the clamps are adapted for individual coupling to one of the flanges and to permit adjustment of the clamp so that it may quickly and effectively engage the flange, such as the flange 13 associated with the adjacent conduit 11. To this end, and referring now to FIG. 3, each of the clamps 16 includes a base 17 having a forward face portion 18, a rear face portion 19 and an axially extending bore 20 therein. As illustrated, the base also includes a leglike projection 21 including a recessed portion 22 which serves to rest on the periphery of the flange 12 while embracing the rear face portion 12A of the flange. A threaded aperture 23 is included in the leglike projection 21 to receive and cooperate with a threaded bolt 24 which passes through the normal bolt holes 25 in the flange to connect the base 17 to the flange 12. Inasmuch as the recess 22 embraces the periphery of the flange on one edge and the outer surface 12A on the other, a single bolt 24 serves to couple the base to the flange.

In order to effect clamping of the first flange 12 to the second flange 13, a clamping hook 26 having a central cylindrical shaft portion 27, a threaded and reduced diameter rear shaft portion 28 and a hook shaped forward portion 29 is provided for axial sliding engagement in the bore 20 of the base 17. As illustrated, the central shaft portion 27 of the clamping hook is disposed in the bore 20 with the hook portion 29 projecting beyond the forward face portion 18 of the base while at least a portion of the rear threaded shaft portion 28 extends beyond the rear face portion 19 of the base 17.

In order to effect axial rearward movement of the clamping hook 26 through the bore, an internally threaded sleeve shaped adjusting nut 30 is adapted for threaded engagement with the rear shaft portion 28 of the clamping hook 26. As illustrated, the sleeve 30 includes at least a radially and outwardly projecting surface 31 for engagement with the rear face portion 19 of the base so that upon rotation of the nut or sleeve 30, rearward axial movement of the shaft 27 in the bore 20, and thus of the clamping hook 26, is effected. Additionally, the hook portion 29 of the clamping hook 26 terminates in a blunt or flat portion 29A which is adapted to engage the rear face portion 13A of the flange 13, the hook portion tightening against the flange upon rearward axial motion of the clamping hook 26. As shown, the effective line of force is through the bolt and leg 21.

After the hook portion 29 engages the rear face 13A of the flange 13, with the radially outward projecting surface 31 engaging the rear face portion 19 of the base 17, it is desirable to add additional engaging pressure so that maximum tightening is effected between the flanges while simultaneously locking the clamp so that any rough motion on the conduits does not unintentionally cause the conduits to break apart. To this end, a pair of rotatable, disk shaped cams 31A are connected on opposite sides of the base 17 as by offset axis pivot pins 32. As illustrated the rotatable cams 31A have an external camming surface 33 which bear against the radially and outwardly projecting surface 31 of the adjusting nut 30. Upon rotation of the cams 31A in a counterclockwise direction as viewed in FIG. 4, a rearward action or motion is imparted to the sleeve 30 causing the radially outwardly projecting surface 31 to be separated from the rear face portion 19 of the base 17 giving an increase in the clamping action of the hooked portion 29 against the rear face 13A of the flange 13. To lock the cams in their rearmost position, the surface of the cam includes a flat 33A which serves as a detent to lock the cam in the position illustrated in FIG. 4.

Figure 3:
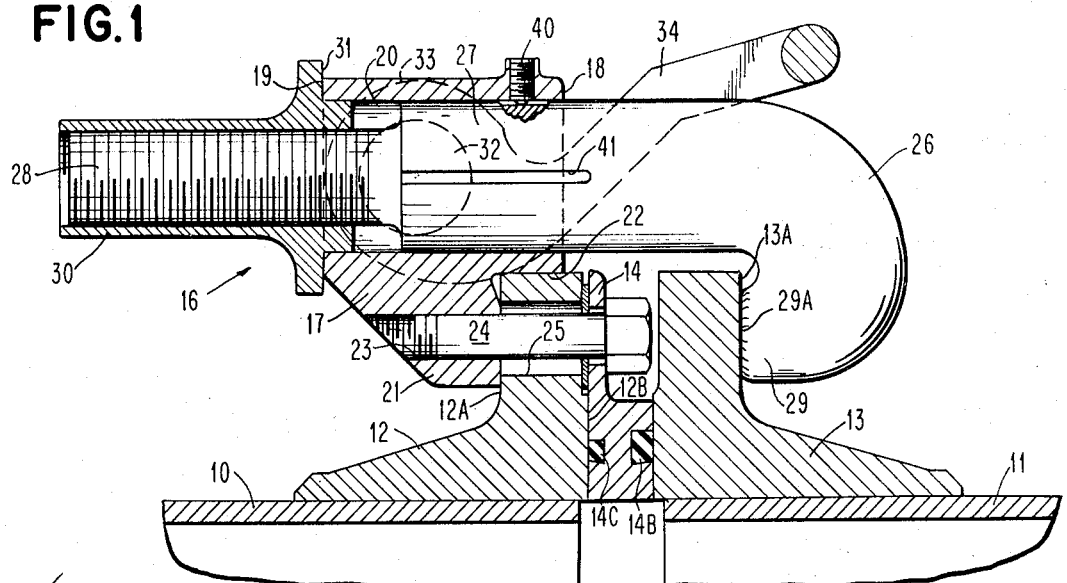
FIG. 3 is an enlarged fragmentary sectional view of one of the clamps illustrated in FIGS. 1 and 2 and showing the clamp in position prior to final tightening.
Figure 4:
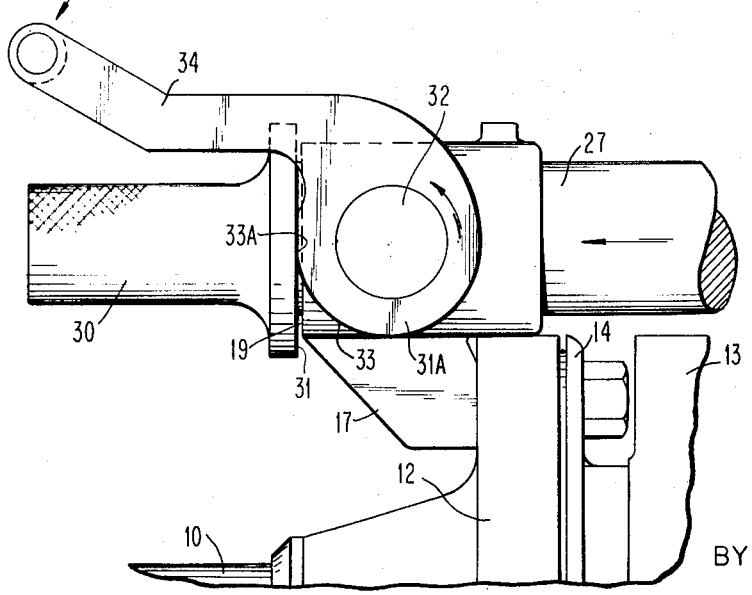
FIG. 4 is an enlarged fragmentary view of the clamp shown in FIG. 3 and illustrating the clamp in its final tightened position.

In order to facilitate the rotation of the cam both into the locked position shown in FIG. 4 and the unlocked position shown in FIGS. 1-3, a lever 34 is integrally connected to each of the disk shaped cams 31A, and terminate in a handle 35 to permit ease of operation and effect rotation of the disk shaped cams 31A about their pivots 32.

As is evident from the foregoing, rotation of the sleeve shaped adjusting nut 30 effects a rearward motion of the clamping hook through the bore 20 of the base, the entire motion being axial relative to the axis of the flanges being connected. However, it should be recognized that as the sleeve 30 is rotated a torque is introduced upon the clamping hook 26 which, unless the hook portion 29 is in engagement with the rear face of the flange to prevent such torque from causing rotation of the clamping hook 26, rotation would occur. To prevent such inadvertent rotation of the hook, means are provided to maintain the rotational position of the clamping hook whether in its connect or disconnect position. To this end detent mechanism 40, in the present instance comprising a biased ball is mounted in the base 17 and projects into the bore 20 cooperating with one of a plurality of axially extending detent grooves 41 in the central shaft portion 27 of the clamping hook 26. In this manner, inadvertent rotation of the clamping hook 26 about its central axis cannot occur. On the other hand, as may be evident from the principal of operation, the hooks may easily be rotated by hand until the ball engages another axial groove. In this manner, the placement of the clamps in and out of engagement with the flange 13, is facilitated.

In most instances where the forward face portion of the flange 12 is not cut deep enough to permit the head of the bolt 24 to be recessed so as to permit face-to-face engagement of the flange 12 with the flange 13, a conventional adapter plate 14 is provided, the adapter plate having apertures 14A aligning for registration with the bolt holes 25 in the flange and being connected to the forward face portion 12B of the flange 12 as by the bolts 24. As is conventional, the adapter plate is annular in structure and includes sealing rings 14B and 14C to cooperate respectively with the forward face portions of the flanges 12 and 13.

It is obvious that some mismatch in flange diameter can be tolerated and still effect a good coupling between contiguous conduit sections. For example, the diameter of the flange 13 can be smaller than the diameter of the flange 12 as long as the hook portion engages the rear face of the flange 13.

Thus the present invention provides a novel modular flange connector for facilitating the coupling of contiguous conduits for the transfer of both liquid and gaseous media while permitting some mismatch in flange size. Additionally, the novel clamps may be mounted individually in any number and any desired spacing around the flange in a quick and easy manner, the number of clamps required being dependent on the size and operating pressure of the flanges, the replacement of two bolts by one clamp being the maximum number of clamps useable restriction. Furthermore, the clamps have straight line, as opposed to pivot type action, and may be rotated so as to facilitate connection or disconnection of adjacent flanges of the conduits.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A modular flange connector for connecting the terminal flanges of conduits one to the other, said connector comprising at least one clamp for attachment to one flange of one conduit and for quick connection to the flange of the other conduit, said clamp comprising:
a tubular base having a forward and rear face portion and an axially extending bore therein;
a leglike projection on said base for forming a rigid connection of said base to a flange;
a clamping hook having a central cylindrical shaft portion, a threaded rear shaft portion and a hook-shaped forward portion, said shaft portion being slideably disposed and limited to axial and rotational displacement in said bore with said hook portion projecting beyond said forward face portion and at least a portion of said rear shaft portion extending beyond said rear face portion, an internally threaded sleeve for threaded engagement with said rear shaft portion; said sleeve having at least a radially outwardly projecting surface for engagement with the rear face portion of said base to thereby effect axial rearward movement of said shaft of said clamping hook through said bore upon rotation of said sleeve about said rear shaft portion; a rotatable cam connected to one of said sleeve and said base, handle means to effect rotation of said cam, and a cam surface on the other of said sleeve and said base for bearing engagement with said cam, said cam, upon rotation thereof, effecting additional rearward axial movement of said clamping hook; and means to maintain the rotational position of said clamping hook as rearward movement is effected.

2. A modular flange connector in accordance with claim 1 wherein said means to maintain rotational position of said clamping hook comprises detent means on one of said base and central shaft portion, and detent cooperating means on the other of said bore and central shaft portion.

3. A modular flange connector in accordance with claim 2 wherein said clamping hook includes a plurality of means for maintaining the rotational position of said clamping hook in a plurality of positions.

4. A modular flange connector in accordance with claim 1 wherein said rotatable cam comprises a disk having an offset axis, and a flat on the periphery of said disk.

5. A modular flange connector in accordance with claim 4 including a lever connected to and integral with said disk, a pin projecting outwardly from said base and forming the axis for said disk.

6. A modular flange connector in accordance with claim 5 including a second disk and lever mounted on a second pin projecting from the opposite side of said base, and a handle connecting said levers.

* * * * *